US006720399B2

(12) United States Patent
Husemann et al.

(10) Patent No.: US 6,720,399 B2
(45) Date of Patent: Apr. 13, 2004

(54) UV-CROSSLINKABLE ACRYLIC HOTMELT PSAS WITH NARROW MOLECULAR WEIGHT DISTRIBUTION

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/197,681

(22) Filed: Jul. 17, 2002

(65) Prior Publication Data
US 2003/0105258 A1 Jun. 5, 2003

(30) Foreign Application Priority Data
Oct. 5, 2001 (DE) .......................... 101 49 084

(51) Int. Cl.$^7$ ............................. C08F 216/04
(52) U.S. Cl. ............. 526/319; 526/905; 526/222; 526/224; 525/309; 522/35; 428/355 R; 428/356
(58) Field of Search ............ 428/355 R, 356; 522/35; 558/248, 268; 526/319, 905, 222, 224; 529/309; 525/309

(56) References Cited

U.S. PATENT DOCUMENTS

| | | | |
|---|---|---|---|
| 4,144,157 A | 3/1979 | Guse et al. ............ 204/159.23 |
| 4,581,429 A | 4/1986 | Solomon et al. ............ 526/220 |
| 5,128,386 A | 7/1992 | Rehmer et al. ............ 522/35 |
| 5,574,117 A * | 11/1996 | Yoshida et al. ............ 526/224 |
| 5,741,829 A * | 4/1998 | Reich et al. ............ 522/35 |
| 5,767,210 A | 6/1998 | Lecomte et al. ............ 526/166 |
| 5,789,487 A | 8/1998 | Matyjaszewski et al. ... 525/301 |
| 5,811,500 A | 9/1998 | Dubois et al. ............ 526/145 |
| 5,854,364 A | 12/1998 | Senninger et al. ........... 526/192 |
| 5,919,871 A | 7/1999 | Nicol et al. ............... 525/333.8 |
| 5,945,491 A | 8/1999 | Matyjaszewski et al. ... 526/111 |
| 6,114,482 A | 9/2000 | Senninger et al. .......... 526/172 |
| 2002/0193539 A1 | 12/2002 | Husemann et al. .......... 526/217 |

FOREIGN PATENT DOCUMENTS

| | | | | |
|---|---|---|---|---|
| DE | 199 49 352 A1 | 4/2000 | ......... C07D/241/52 |
| DE | 10030217 A1 * | 1/2002 | ............ C08F/2/00 |
| DE | 100 30 217 A1 | 1/2002 | ......... C08F/220/18 |
| DE | 100 36 801 A1 | 2/2002 | .......... C09J/133/10 |
| EP | 0 377 199 | 7/1990 | ......... C08F/220/30 |
| EP | 0 735 052 A2 | 3/1996 | ............. C08F/2/38 |
| EP | 0 824 110 A1 | 2/1998 | ............. C08F/4/00 |
| EP | 0 824 111 A1 | 2/1998 | ............. C08F/4/00 |
| EP | 0 826 698 A1 | 3/1998 | ............. C08F/4/00 |
| EP | 0 841 346 A1 | 5/1998 | ............. C08F/4/00 |
| EP | 0 850 957 A1 | 7/1998 | ............. C08F/4/00 |
| GB | 2 342 649 A | 4/2000 | ......... C07D/233/30 |
| WO | WO 96/24620 | 8/1996 | ............. C08F/4/00 |
| WO | WO 97/34935 | 9/1997 | ............. C08F/2/20 |
| WO | WO 98/01478 | 1/1998 | ............. C08F/2/38 |
| WO | WO 98/13392 | 4/1998 | ............. C08F/4/00 |
| WO | WO 98/30601 | 7/1998 | ............. C08F/4/00 |
| WO | WO 98/44008 | 10/1998 | ............. C08F/4/00 |
| WO | WO 99/31144 | 6/1999 | ............. C08F/2/38 |
| WO | WO 99/62961 | 12/1999 | ............. C08F/2/50 |
| WO | WO 01/98383 A1 | 12/2001 | ........... C08F/20/12 |

* cited by examiner

Primary Examiner—David W. Wu
Assistant Examiner—Satiya Sastri
(74) Attorney, Agent, or Firm—Norris McLaughlin & Marcus

(57) ABSTRACT

A polyacrylate pressure sensitive adhesive, having
  an average molecular weight $M_w$ (weight average) of from 100 000 to 600 000 g/mol
  a polydispersity of not more than 3.0
  copolymerized photoinitiator units, and
  a process for preparing a UV-crosslinkable polyacrylate pressure sensitive adhesive having a polydispersity of not more 3.0, comprising
    a radical polymerization process for preparing a polymer from a monomer mixture,
    the monomer mixture to be polymerized comprising copolymerizable photoinitiators,
    the polymerization process being regulated by the presence of at least one chemical compound comprising the unit

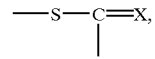

in which X is S, O or N as polymerization regulator.

20 Claims, No Drawings

UV-CROSSLINKABLE ACRYLIC HOTMELT PSAS WITH NARROW MOLECULAR WEIGHT DISTRIBUTION

The invention relates to a polyacrylate pressure sensitive adhesive (PSA), to a process for preparing such a PSA, and to the use of such PSAs.

BACKGROUND OF THE INVENTION

For industrial PSA tape applications it is very common to use polyacrylate PSAs. Polyacrylates possess a variety of advantages over other elastomers. They are highly stable toward UV light, oxygen, and ozone. Synthetic and natural rubber adhesives normally contain double bonds, which make these adhesives unstable to the aforementioned environmental effects. Further advantages of polyacrylates include their transparency and their serviceability within a relatively wide temperature range.

Polyacrylate PSAs are generally prepared in solution by free radical polymerization. The polyacrylates are generally applied to the corresponding backing material from solution using a coating bar, and then dried. In order to increase the cohesion, the polymer is crosslinked. Curing takes place thermally or by UV crosslinking or by EB curing (EB: electron beams). The process described is fairly costly and ecologically objectionable, since as a general rule the solvent is not recycled and the high consumption of organic solvents represents a high environmental burden.

Moreover, it is very difficult to produce PSA tapes with a high adhesive application rate, without bubbles.

One remedy to these disadvantages is the hotmelt process. In this process, the PSA is applied to the backing material from the melt.

However, this new technology has its limitations. Prior to coating, the solvent is removed from the PSA in a drying extruder. The drying process is associated with a relatively high temperature and shearing effect, so that high molecular mass polyacrylate PSAs in particular are severely damaged. The acrylic PSA gels, or the low molecular mass fraction is greatly enriched as a result of molecular weight breakdown. Both effects are undesirable, since they are disadvantageous for the application. Either the adhesive can no longer be applied or there are changes in its technical adhesive properties, since, for example, when a shearing force acts on the adhesive the low molecular mass fractions act as lubricants and so lead to premature failure of the adhesive.

One solution to mitigating these disadvantages is offered by polyacrylate adhesives with a low average molecular weight and narrow molecular weight distribution. In this case the fraction of low molecular mass and high molecular mass molecules in the polymer is greatly reduced by the polymerization process. The absence of the high molecular mass fractions reduces the flow viscosity, and the adhesive shows less of a tendency to gel. As a result of the reduction in the low molecular mass fraction, the number of oligomers which reduce the shear strength of the PSA is lessened.

A further disadvantage of relatively low molecular mass acrylic PSAs is the relatively low crosslinking propensity. Short polymer chains are generally crosslinked less efficiently, since there is a lesser probability that a polymer radical will meet a second polymer chain. In order to increase the crosslinking efficiency, therefore, promoters are needed.

A variety of polymerization methods are suitable for preparing low molecular mass PSAs. The state of the art is to use regulators, such as alcohols or thiols, for example (Makromoleküle, Hans-Georg Elias, $5^{th}$ Edition, 1990, H üthig & Wepf Verlag Basel). These regulators reduce the molecular weight but broaden the molecular weight distribution.

Another controlled polymerization method used is that of atom transfer radical polymerization (ATRP), in which initiators used preferably include monofunctional or difunctional secondary or tertiary halides and, for abstracting the halide(s), complexes of Cu, Ni, Fe, Pd, Pt, Ru, Os, Rh, Co, Ir, Cu, Ag or Au [EP 0 824 111; EP 0 826 698; EP 0 824 110; EP 0 841 346; EP 0 850 957]. The various possibilities of ATRP are further described in U.S. Pat. Nos. 5,945,491, 5,854,364 and 5,789,487. Generally, metal catalysts are used, which have the side effect of adversely influencing the aging of the PSAs (gelling, transesterification). Moreover, the majority of metal catalysts are toxic, discolor the adhesive, and can be removed from the polymer only by means of complicated precipitations.

U.S. Pat. No. 4,581,429 discloses a controlled radical polymerization process. As its initiator the process employs a compound of the formula R'R"N—O—X, in which X denotes a free radical species which is able to polymerize unsaturated monomers. In general, however, the reactions have low conversion rates. A particular problem is the polymerization of acrylates, which takes place only with very low yields and molecular weights.

WO 98/13392 describes open-chain alkoxyamine compounds which have a symmetrical substitution pattern. EP 0 735 052 A1 discloses a process for preparing thermoplastic polymers having narrow polydispersities.

WO 96/24620 describes a polymerization process in which very specific radical compounds, such as phosphorus-containing nitroxides, for example, are described.

WO 98/30601 discloses specific nitroxyls, based on imidazolidine.

WO 98/4408 discloses specific nitroxyls based on morpholines, piperazinones, and piperazinediones.

DE 199 49 352 A1 discloses heterocyclic alkoxyamines as regulators in controlled radical polymerizations.

Corresponding further developments of the alkoxyamines or of the corresponding free nitroxides improved the efficiency for the preparation of polyacrylates. [Hawker, C. J., Paper, National Meeting of the American Chemical Society in San Francisco, Spring 1997; Husemann, M., IUPAC World Polymer Meeting 1998, Gold Coast, Australia, Paper on "Novel Approaches to Polymeric Brushes using 'Living' Free Radical Polymerizations" (July 1998).]

In the abovementioned patents and papers attempts were made to improve the control of radical polymerization reactions. There nevertheless exists a need for a nitroxide-controlled polymerization process which is highly reactive and can be used to realize high conversions in combination with high molecular weight and low polydispersity. These requirements have been met in DE 100 36 801.8.

Nevertheless, this type of compound does not promote efficient crosslinking. Instead, nitroxides generally act as carbon radical scavengers and therefore possess an inhibitory effect as far as crosslinking is concerned.

BASF AG offers UV AC-Resins™ containing copolymerizable photoinitiators based on benzophenone. By this route, the photoinitiators are attached to the polymer, are not volatile, and can be effectively UV-crosslinked as a result of the binding to the polymer. A similar path was taken by Guse (U.S. Pat. No. 4,144,157). These acrylic PSAs are readily UV-crosslinkable and can be processed as hotmelts, but as a result of the broad molecular weight distribution they do not possess good technical adhesive properties.

A further variant is the RAFT process (Reversible Addition-Fragmentation Chain Transfer). The process is described at length in WO 98/01478 and WO 99/31144, but in the manner set out therein is unsuited to the preparation of PSAs, since the conversions achieved are very low and the average molecular weight of the polymers prepared is too low for acrylic PSAs. Accordingly, the polymers described cannot be used as acrylic PSAs. An improvement was achieved with the process described by BDF in DE 100 30 217.3.

The above-described process cannot, however, be used for UV crosslinking, since the compounds described likewise possess a radical scavenger effect, so that the crosslinking efficiency following addition of the free UV photoinitiator is too low. Moreover, there is a risk that the abovementioned types of compound will be unstable over a prolonged period—such as is necessarily the case in a hotmelt process, for example—and would decompose.

A central problem which therefore remains is the efficient UV crosslinking of narrow-distribution acrylic PSAs for the purpose of preparing improved acrylic PSAs.

It is an object of the invention, therefore, to provide a polyacrylate composition which has very good hotmelt processing properties and thereafter can be crosslinked very effectively, and also a process for preparing such UV-crosslinkable acrylic hotmelt pressure sensitive adhesives, which does not have the disadvantages of the aforementioned prior art, or at least not to so great an extent.

SUMMARY OF THE INVENTION

Surprisingly it has been found that narrow-distribution polyacrylate hotmelt pressure sensitive adhesives with copolymerized photoinitiators can be processed very effectively in a melt process and can be crosslinked very efficiently by UV crosslinking, and that they can be prepared outstandingly in a specially regulated process.

According to one aspect of the invention there is provided a polyacrylate pressure sensitive adhesive which has an average molecular weight $M_w$ (weight average) of from 100 000 to 600 000 g/mol, possesses a polydispersity of not more than 3.0, and contains copolymerized photoinitiator units.

DETAILED DESCRIPTION

For the properties of the polyacrylate PSA it is very advantageous if one or more resins are admixed, preferably in fractions of up to 50% by weight, very preferably from 20 to 40% by weight.

It is further advantageous to add additives such as aging inhibitors, light stabilizers, ozone protectants, fatty acids, plasticizers, nucleators, blowing agents, accelerators, fillers and/or the like.

The invention further provides a process suitable for preparing polyacrylate pressure sensitive adhesives having a polydispersity of not more than 3.0. This is done by way of a radical polymerization process, in which a monomer mixture containing copolymerizable photoinitiators is polymerized in a process regulated by the presence of at least one chemical compound comprising the unit

in which X is S, O or N.

Polymerization regulators of this kind which can be used very advantageously for the purposes of the invention include trithiocarbonates and dithioesters.

In a further development of the inventive process, following polymerization, which is preferably conducted up to a conversion of >98%, the polymer is concentrated to a hotmelt, the solvent being removed down to a maximum residual level of 0.1%, so that the polymer is in the form of a melt. In a further development of the process, the polymer is subsequently coated in gel-free form from the melt onto a backing ("gel-free" denotes compliance with the requirements for coatability of the compositions with the coating apparatus that is commonly used and is familiar to the skilled worker for these purposes, and particularly the requirement for coatability, featuring a uniform (homogeneous) coating pattern with no inhomogeneities or streaks when using the customary coating nozzles).

It is then advantageous to crosslink the polymer by UV radiation, particularly after coating onto the backing. In a preferred procedure here, the UV crosslinking is assisted by the added polymerization regulator.

In summary, the following scheme can be drawn up for an advantageous procedure:

polymerization of a monomer mixture containing not only monomers based on (meth)acrylic acid but also copolymerizable photoinitiators, with polydispersities of from 1.2 to 3.5 being achieved through the use of a control reagent, the polymer is concentrated to a hotmelt, the polymer can be processed without gelling for 24 h in the hotmelt process in the absence of air or under nitrogen, the polymer is coated gel-free from the melt, and after coating, crosslinking is carried out with UV light, the added regulator assisting and accelerating UV crosslinking.

The UV-crosslinking, narrow-distribution polyacrylate PSA is preferably composed of the following monomers:

a) acrylates and/or methacrylates and/or their free acids with the following formula $CH_2=CH(R_1)(COOR_2)$, where $R_1$ is H or $CH_3$ and $R_2$ is an alkyl chain having 1–30 carbon atoms or H, at 70–99.9% by weight, especially 75–99.5% by weight, b) UV photoinitiator containing a radically polymerizable double bond, at 0.1–2% by weight, especially 0.4–1% by weight, c) olefinically unsaturated monomers containing functional groups, at 0–30% by weight.

In one very preferred version, the monomers a) used are acrylic monomers, comprising acrylic and methacrylic esters with alkyl groups composed of from 4 to 14 carbon atoms, preferably from 4 to 9 carbon atoms. Specific examples, without wishing to impose any unnecessary restriction by such a list, include n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof, such as 2-ethylhexyl acrylate, for example. Further classes of compound which may likewise be added in small amounts under a) are methyl methacrylates, cyclohexyl methacrylates, and isobornyl methacrylates.

In one very preferred version, photoinitiators used for the monomers b) are those comprising at least one vinyl compound. The photoinitiators may be of the Norrish I or Norrish II type. As building blocks the photoinitiators contain preferably one or more of the following radicals: benzophenone, acetophenone, benzyl, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone, it being possible additionally for each of these radicals to be substituted by one or more halogen atoms and/or one or more alkoxy groups, and/or one or more amino groups and/or hydroxyl groups. A representative overview is given in "Photoinitiation Photopolymerization and Photocuring, Fundamentals and Applications", by J. -P. Fouassier, Hanser Publishers, Munich, Vienna, N.Y. 1995. Further details can be gleaned from "Chemistry & Technology of UV & EB formulation for Coatings, Inks & Paints", Volume 5, A. Carroy, C. Decker, J. P. Dowling, P. Pappas, B. Monroe, ed. by P. K. T. Oldring, publ. by SITA Technology, London, England 1994.

Specific examples, without wishing to be restricted unnecessarily as a result, include acrylated benzophenone, such as Ebecryl P 36™ from UCB, or benzoin acrylate.

In one very peferred version the monomers c) used are vinyl esters, vinyl ethers, vinyl halides, vinylidene halides, vinyl compounds with aromatic cycles and heterocycles in the α position. Here again, a number of nonexclusive examples may be mentioned: vinyl acetate, vinylformamide, vinylpyridine, ethyl vinyl ether, vinyl chloride, vinylidene chloride and acrylonitrile. In a further very preferred version for the monomers c) monomers are used containing the following functional groups: hydroxyl, carboxyl, epoxy, acid amide, isocyanato or amino groups.

In one advantageous variant, acrylic monomers of the following general formula are used for c):

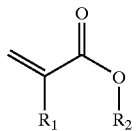

where $R_1$=H or $CH_3$ and the radical —$OR_2$ represents or comprises the functional group and, in one particularly preferred embodiment, possesses, for example, an H-donor effect which facilitates UV crosslinking.

Particularly preferred examples of component c) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this list not being conclusive.

In a further preferred version aromatic vinyl compounds are used for component c), the aromatic nuclei preferably being from $C_4$ to $C_{18}$ and further containing heteroatoms if desired. Particularly preferred examples are styrene, 4-vinylpyridine, N-vinylphthalimide, methylstyrene, 3,4-dimethoxystyrene, 4-vinylbenzoic acid, this list not being conclusive.

For polymerization the monomers are chosen such that the resulting polymers can be used as industrial PSAs, especially in such a way that the resulting polymers possess PSA properties in accordance with the "Handbook of Pressure Sensitive Adhesive Technology" by Donatas Satas (van Nostrand, N.Y. 1989). For these applications the static glass transition temperature of the resulting polymer is advantageously below 25° C.

For the polymerization it is preferred to use a control reagent of the general formula:

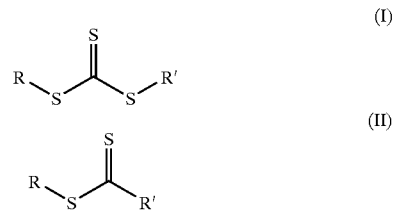

in which
R and R' are chosen independently of one another or are identical and are
branched and unbranched $C_1$ to $C_{18}$ alkyl radicals; $C_3$ to $C_{18}$ alkenyl radicals; $C_3$ to $C_{18}$ alkynyl radicals;
H or $C_1$ to $C_{18}$ alkoxy;
$C_3$ to $C_{18}$ alkynyl radicals, $C_3$ to $C_{18}$ alkenyl radicals, $C_1$ to $C_{18}$ alkyl radicals substituted by at least one OH group or a halogen atom or a silyl ether;
$C_2$–$C_{18}$ heteroalkyl radicals having at least one oxygen atom and/or an NR' group in the carbon chain;
$C_3$ to $C_{18}$ alkynyl radicals, $C_3$ to $C_{18}$ alkenyl radicals, $C_1$ to $C_{18}$ alkyl radicals substituted by at least one ester group, amine group, carbonate group, cyano group, isocyanato group and/or epoxide group and/or by sulfur;
$C_3$–$C_{12}$ cycloalkyl radicals;
$C_6$–$C_{18}$ aryl or benzyl radicals;
hydrogen.

In one more preferred version, control reagents of type (I) consist of the following compounds:
halogens are preferably F, Cl, Br or I, more preferably Cl and Br. As alkyl, alkenyl and alkynyl radicals in the various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl, and octadecyl.

Examples of alkenyl radicals containing from 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl, and oleyl.

Examples of alkynyl containing from 3 to 18 carbon atoms are propynyl, 2-butynyl, 3-butynyl, n-2-octynyl, and n-2-octadecynyl.

Examples of hydroxy-substituted alkyl radicals are hydroxypropyl, hydroxybutyl, and hydroxyhexyl.

Examples of halogen-substituted alkyl radicals are dichlorobutyl, monobromobutyl, and trichlorohexyl.

An example of a suitable $C_2$–$C_{18}$ heteroalkyl radical containing at least one oxygen atom in the carbon chain is —$CH_2$—$CH_2$—O—$CH_2$—$CH_3$.

Examples of $C_3$–$C_{12}$ cycloalkyl radicals include cyclopropyl, cyclopentyl, cyclohexyl, and trimethylcyclohexyl.

Examples of $C_6$–$C_{18}$ aryl radicals include phenyl, naphthyl, benzyl, 4-tert-butylbenzyl or further substituted phenyl, such as ethylbenzene, toluene, xylene, mesitylene, isopropylbenzene, dichlorobenzene or bromotoluene.

The above listings serve only as examples of the respective groups of compounds, and make no claim to completeness.

Further suitable control reagents include compounds of the following types:

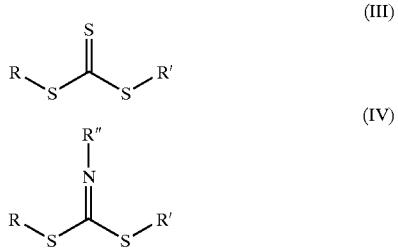

(III)

(IV)

in which R″ may comprise the abovementioned radicals R or R′, independently of their selection.

In one particularly preferred embodiment of the invention compounds (Ia) and (IIa) are used as control reagents.

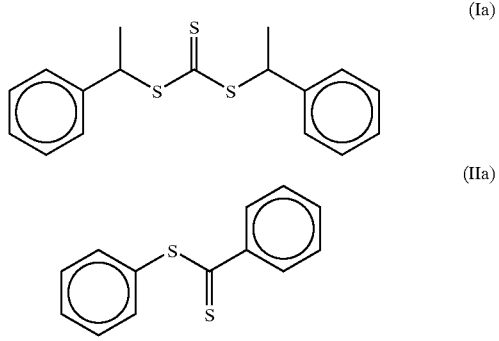

(Ia)

(IIa)

In connection with the abovementioned polymerizations proceeding by a controlled radical process, preference is given to using initiator systems which further comprise further radical initiators for the polymerization, especially thermally decomposing, radical-forming azo or peroxo initiators. In principle, all customary initiators which are known for acrylates are suitable for this purpose. The production of C-centered radicals is described in Houben Weyl, Methoden der Organischen Chemie, Vol. E 19a, pp. 60–147. These methods are employed, preferentially, in analogy.

Examples of radical sources are peroxides, hydroperoxides, and azo compounds; some nonlimiting examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred version, 1,1′-azobis (cyclohexanecarbonitrile) (Vazo 88™ from DuPont) is used as radical initiator.

The average molecular weights $M_w$ (weight average) of the polymers formed in the controlled radical polymerization are chosen so that they are situated within a range from 100 000 to 600 000 g/mol; specifically for further use as hotmelt PSAs, adhesives having average molecular weights (weight average) $M_w$ of from 100 000 to 350 000 g/mol are prepared. The average molecular weight $M_w$ is determined by size exclusion chromatography (gel permeation chromatography, GPC) or matrix-assisted laser desorption/ionization mass spectrometry (MALDI-MS).

The polymerization may be conducted in bulk, in the presence of an organic solvent or mixtures of organic solvents, in the presence of water, or in mixtures of organic solvents and water. The aim is to minimize the amount of solvent used. Suitable organic solvents or solvent mixtures are pure alkanes (hexane, heptane, octane, isooctane), aromatic hydrocarbons (benzene, toluene, xylene), esters (ethyl, propyl, butyl or hexyl acetate), halogenated hydrocarbons (chlorobenzene), alkanols (methanol, ethanol, ethylene glycol, ethylene glycol monomethyl ether), ethers (diethyl ether, dibutyl ether) or mixtures thereof. A water-miscible or hydrophilic cosolvent may be added to the aqueous polymerization reactions in order to ensure that the reaction mixture is present in the form of a homogeneous phase during monomer conversion. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones and the like, and also derivatives and mixtures thereof.

The polymerization time—depending on conversion and temperature—is between 4 and 72 hours. The higher the reaction temperature which can be chosen, i.e., the higher the thermal stability of the reaction mixture, the shorter the possible reaction time.

As regards initiation of the polymerization, the introduction of heat is essential for the thermally decomposing initiators. For these initiators the polymerization can be initiated by heating to from 50 to 160° C., depending on initiator type.

For the use of the polymers prepared by the inventive process (polyacrylates) as pressure sensitive adhesives, they are optimized by optional blending with at least one resin. Tackifying resins to be added include without exception all existing tackifier resins described in the literature. Representatives that may be mentioned include pinene resins, indene resins, and rosins, their disproportionated, hydrogenated, polymerized, esterified derivatives and salts, the aliphatic and aromatic hydrocarbon resins, terpene resins and terpene-phenolic resins, and also C5, C9 and other hydrocarbon resins. Any desired combinations of these and other resins may be used in order to adjust the properties of the resulting adhesive in accordance with what is desired. In general it is possible to use all resins which are compatible (soluble) with the corresponding polyacrylate; mention may be made in particular of all aliphatic, aromatic, alkylaromatic hydrocarbon resins, hydrocarbon resins based on pure monomers, hydrogenated hydrocarbon resins, functional hydrocarbon resins, and natural resins. Explicit reference is made to the depiction of the state of the art in the "Handbook of Pressure Sensitive Adhesive Technology" by Donatas Satas (van Nostrand, 1989).

In a further advantageous development one or more plasticizers are added to the polyacrylates, such as low molecular mass polyacrylates, phthalates, whale oil plasticizers or plasticizer resins, for example.

The polyacrylates may further be blended with one or more additives such as aging inhibitors, light stabilizers, ozone protectants, fatty acids, resins, nucleators, blowing agents, compounding agents and/or accelerators. The aging inhibitors are, in particular, primary and secondary aging inhibitors, which are available commercially under the trade names Irganox™ from Ciba Geigy and Hostanox™ from Clariant.

They may further be admixed with one or more fillers such as fibers, carbon black, zinc oxide, titanium dioxide, solid or hollow glass (micro)beads, microbeads of other materials, silica, silicates, and chalk, with the addition of blocking-free isocyanates being a further possibility.

Particularly for use as a pressure sensitive adhesive it is of advantage for the inventive process if the polyacrylate (the resulting polymer) is applied preferably from the melt, gel-free, to a backing or to a backing material, as a film.

For this purpose the polyacrylates prepared as described above are concentrated to give a polyacrylate composition whose solvent content is $\leq 2\%$ by weight, with particular preference $\leq 0.5\%$ by weight. This process takes place preferably in a concentrating extruder. Then, in one advantageous variant of the process, the polyacrylate composition is applied in the form of a film, as a hotmelt composition, to a backing or to a backing material.

Backing materials used for the PSA, for adhesive tapes for example, are the materials customary and familiar to the skilled worker, such as films (polyesters, PET, PE, PP, BOPP, PVC), nonwovens, foams, wovens and woven films, and also release paper (glassine, HDPE, LDPE). This list is not conclusive.

For the PSA utility it is particularly advantageous to crosslink the polyacrylates following application to the backing or to the backing material. For this purpose, in order to produce the PSA tapes, the polymers described above are optionally blended with crosslinkers. Preferred radiation-crosslinking substances in accordance with the process of the invention are, for example, difunctional or polyfunctional acrylates or difunctional or polyfunctional urethane acrylates, difunctional or polyfunctional isocyanates or difunctional or polyfunctional epoxides. However, it is also possible here to use any other difunctional or polyfunctional compounds which are familiar to the skilled worker and are capable of crosslinking polyacrylates.

In order to improve the crosslinking efficiency, the polyacrylates may where appropriate be blended with further, uncopolymerized photoinitiators. Those suitable for this purpose preferably include Norrish Type I and Type II cleavers, some possible examples of both classes being benzophenone, acetophenone, benzyl, benzoin, hydroxyalkylphenone, phenyl cyclohexyl ketone, anthraquinone, thioxanthone, triazine, or fluorenone derivatives, this list making no claim to completeness. A representative overview is again given in "Photoinitiation Photopolymerization and Photocuring, Fundamentals and Applications", by J. -P. Fouassier, Hanser Publishers, Munich, Vienna, N.Y. 1995. For further details consult "Chemistry & Technology of UV & EB formulation for Coatings, Inks & Paints", Volume 5, A. Carroy, C. Decker, J. P. Dowling, P. Pappas, B. Monroe, ed. by P. K. T. Oldring, publ. by SITA Technology, London, England 1994.

UV crosslinking takes place very preferably by means of brief ultraviolet irradiation in a wavelength range from 200 to 450 nm, especially using high or medium pressure mercury lamps with an output of from 80 to 240 W/cm. For UV crosslinking it is, however, also possible to use monochromatic radiation in the form of lasers. In order to prevent instances of overheating it may be appropriate to shade off part of the UV beam path. It is also possible to use special reflector systems which act as cold light emitters in order thereby to prevent overheating.

It may be appropriate to crosslink the polyacrylates described in accordance with the invention using electron beams as well. Typical irradiation equipment which may be used includes linear cathode systems, scanner systems or segmented cathode systems, where electron beam accelerators are concerned. A detailed description of the state of the art and of the major process parameters can be found in Skelhorne, "Electron Beam Processing" in Vol. 1 "Chemistry & Technology of UV & EB Formulations for Coatings, Inks & Paints" published by Sita Technology, London 1991. The typical accelerating voltages are situated in a range between 50 kV and 500 kV, preferably from 80 kV to 300 kV. The radiation doses employed range between 5 to 50 kGy, in particular from 20 to 100 kGy.

The invention further provides for the use of the polyacrylate pressure sensitive adhesive for an adhesive tape, in which case the polyacrylate pressure sensitive adhesive may have been applied to one or both sides of a backing.

EXAMPLES

Test Methods

The following test methods were used in order to evaluate both the adhesive properties and the general properties of the PSAs prepared.

180° Bond Strength Test (Test A)

A strip 20 mm wide of an acrylic PSA applied to a polyester layer was applied to steel plates. The PSA strip was pressed down twice onto the substrate using a 2 kg weight. The adhesive tape was then immediately removed from the substrate at an angle of 180° and a speed of 300 mm/min. The steel plates were washed twice with acetone and once with isopropanol beforehand. The results are reported in N/cm and are averaged from three measurements. All measurements were carried out at room temperature.

Shear Strength (Test B)

A strip 13 mm wide of the adhesive tape was applied to a smooth steel surface which had been cleaned three times with acetone and once with isopropanol. The area of application measured 20 mm*13 mm (length*width). The adhesive tape was then pressed onto the steel backing four times using an applied pressure of 2 kg. At 23° C., a 1 kg weight was fastened to the adhesive tape. The shear stability times measured are reported in minutes and correspond to the average of three measurements.

Gel Permeation Chromatography GPC (Test C)

The average molecular weight $M_w$ and the polydispersity PD were determined by gel permeation chromatography. The eluent used was THF containing 0.1% by volume trifluoroacetic acid. Measurement was carried out at 25° C. The precolumn used was PSS-SDV, $5\mu$, $10^3$ Å, ID 8.0 mm×50 mm. Separation was carried out using the columns PSS-SDV, $5\mu$, $10^3$ and also $10^5$ and $10^6$ each with ID 8.0 mm×300 mm. The sample concentration was 4 g/l, the flow rate 1.0 ml per minute. Measurement was carried out against PMMA Standards.

Determination of the Gel Fraction (Test D)

The carefully dried, solvent-free adhesive samples are welded into a pouch of polyethylene nonwoven (Tyvek nonwoven). From the difference in the sample weights before and after extraction with toluene the gel index is determined, i.e. the weight fraction of polymer that is not soluble in toluene.

Practical Procedures

Implementation of the Hotmelt Process in a Recording Extruder (Method E)

The acrylic hotmelt process was simulated in the Rheomix 610p recording extruder from Haake. The drive unit available was the Rheocord RC 300p instrument. The instrument was controlled using the PolyLab System software. The extruder was charged in each case with 52 g of solvent-free acrylic PSA (~80% fill level). The experiments were conducted at a kneading temperature of 120° C., a rotary speed of 40 rpm, and a kneading time of 24 hours. Thereafter the samples were coated at a rate of 50 g/m$^2$ onto a PET film, 23 μm thick and provided with a Saran primer, using a hotmelt coater with two heatable rolls.

UV Irradiation

UV irradiation was carried out using a UV unit from Eltosch. The unit is equipped with a medium pressure Hg UV lamp with an intensity of 120 W/cm. The swatch samples were each passed through the unit at a speed of 20 m/min, and were irradiated in a plurality of passes in order to increase the irradiation dose. The UV dose was measured using the Power Puck from Eltosch. The dose of one irradiation pass was approximately 140 mJ/cm$^2$ in the UV-B range and 25 mJ/cm$^2$ in the UV-C range.

Preparation of bis-2,2'-phenylethyl thiocarbonate (Ia)

Bis-2,2'-phenylethyl thiocarbonate was synthesized starting from 2-phenylethyl bromide with carbon disulfide and sodium hydroxide in accordance with a specification from Synth.

Communications 18(13), pp. 1531–1536, 1988. Yield after distillation: 72%. Characterization: $^1$H-NMR (CDCl$_3$) δ (ppm): 7.20–7.40 (m, 10H), 1.53, 1.59 (2×d, 6H), 3.71, 3.81 (2×m, 2H).

Photoinitiators

Acrylated benzophenone is available commercially as Ebecryl P 36™ from UCB. Benzoin acrylate was prepared in accordance with a specification by Guse in U.S. Pat. No. 4,144,157. Benzophenone is available commercially from Sigma-Aldrich.

Production of the Reference Specimens

Example R1

Broad $M_w$ Distribution; UV Crosslinking Without UV Initiator

A 2 L glass reactor conventional for radical polymerizations was charged with 20 g of acrylic acid, 380 g of n-butyl acrylate and 133 g of acetone/isopropanol (83:17). Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone/isopropanol (83:17) mixture were added for dilution. In order to reduce the residual initiators, 0.6 g portions of bis(4-tert-butylcyclohexanyl) peroxydicarbonate (Perkadox 16™, Akzo Nobel) were added after 8 hours and after 10 hours. The reaction was terminated after 24 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R2

Narrow $M_w$ Distribution; UV Crosslinking Without UV Initiator

A 2 L glass reactor conventional for radical polymerizations was charged with 20 g of acrylic acid, 380 g of n-butyl acrylate, 0.55 g of bis-2,2'-phenylethyl thiocarbonate and 170 g of acetone. Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R3

Narrow $M_w$ Distribution; Free UV Photinitiator

A 2 L glass reactor conventional for radical polymerizations was charged with 20 g of acrylic acid, 380 g of n-butyl acrylate, 0.55 g of bis-2,2'-phenylethyl thiocarbonate and 170 g of acetone. Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone were added for dilution. The reaction was terminated after 48 hours and the product cooled to room temperature. During cooling, 0.5% by weight of benzophenone was introduced with stirring. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R4

Broad $M_w$ Distribution; UV Photoinitiator

A 2 L glass reactor conventional for radical polymerizations was charged with 18 g of acrylic acid, 380 g of n-butyl acrylate, 2 g of acrylated benzophenone Ebecryl P 36™ (from UCB) and 133 g of acetone/isopropanol (83:17). Nitrogen gas was passed through the mixture with stirring for 45 minutes, after which the reactor was heated to 58° C. and 0.2 g of azoisobutyronitrile (AIBN, Vazo 64™, DuPont)

was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone/isopropanol (83:17) mixture were added for dilution. In order to reduce the residual initiators, 0.6 g portions of bis(4-tert-butylcyclohexanyl) peroxydicarbonate (Perkadox 16™, Akzo Nobel) were added after 8 hours and after 10 hours. The reaction was terminated after 24 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R5

Broad $M_w$ Distribution; UV Photoinitiator

A 2 L glass reactor conventional for radical polymerizations was charged with 18 g of acrylic acid, 380 g of n-butyl acrylate, 2 g of benzoin acrylate and 133 g of acetone/isopropanol (83:17). Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone/isopropanol (83:17) mixture were added for dilution. In order to reduce the residual initiators, 0.6 g portions of bis(4-tert-butylcyclohexanyl) peroxydicarbonate (Perkadox 16™, Akzo Nobel) were added after 8 hours and after 10 hours. The reaction was terminated after 24 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R6

Broad $M_w$ Distribution; UV photoinitiator

A 2 L glass reactor conventional for radical polymerizations was charged with 18 g of acrylic acid, 380 g of n-butyl acrylate, 2 g of acrylated benzophenone Ebecryl P 36™ (from UCB) and 266 g of acetone/isopropanol (83:17). Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone/isopropanol (83:17) mixture were added for dilution. In order to reduce the residual initiators, 0.6 g portions of bis(4-tert-butylcyclohexanyl) peroxydicarbonate (Perkadox 16™, Akzo Nobel) were added after 8 hours and after 10 hours. The reaction was terminated after 24 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example R7

Broad $M_w$ Distribution; UV Photoinitiator

A 2 L glass reactor conventional for radical polymerizations was charged with 18 g of acrylic acid, 380 g of n-butyl acrylate, 2 g of benzoin acrylate and 266 g of acetone/isopropanol (83:17). Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone/isopropanol (83:17) mixture were added for dilution. In order to reduce the residual initiators, 0.6 g portions of bis(4-tert-butylcyclohexanyl) peroxydicarbonate (Perkadox 16™, Akzo Nobel) were added after 8 hours and after 10 hours. The reaction was terminated after 24 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 1

Narrow $M_w$ Distribution; UV Photoinitiator

A 2 L glass reactor conventional for radical polymerizations was charged with 18 g of acrylic acid, 380 g of n-butyl acrylate, 2 g of acrylated benzophenone Ebecryl P 36™ (from UCB), 0.55 g of bis-2,2'-phenylethyl thiocarbonate and 170 g of acetone. Nitrogen gas was passed through the mixture with stirring for 45 minutes, after which the reactor was heated to 58° C. and 0.3 g of azoisobutyronitrile (AIBN, Vazo 64™, DuPont) was added. Then the external heating bath was heated to 75° C. and the reaction was carried out constantly at this external temperature. After a reaction time of 1 hour a further 0.3 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 2

Narrow $M_w$ Distribution; UV Photoinitiator

A 2 L glass reactor conventional for radical polymerizations was charged with 18 g of acrylic acid, 380 g of n-butyl acrylate, 2 g of benzoin acrylate, 0.55 g of bis-2,2'-phenylethyl thiocarbonate and 133 g of acetone. Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 3

Narrow $M_w$ Distribution; UV Photoinitiator

A 2 L glass reactor conventional for radical polymerizations was charged with 18 g of acrylic acid, 380 g of n-butyl acrylate, 2 g of acrylated benzophenone Ebecryl P 36™ (from UCB), 0.55 g of bis-2,2'-phenylethyl thiocarbonate and 266 g of acetone. Nitrogen gas was passed through the mixture with stirring for 45 minutes, after which the reactor was heated to 58° C. and 0.3 g of azoisobutyronitrile (AIBN, Vazo 64™, DuPont) was added. Then the external heating bath was heated to 75° C. and the reaction was carried out constantly at this external temperature. After a reaction time of 1 hour a further 0.3 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 4

Narrow $M_w$ Distribution; UV Photoinitiator

A 2 L glass reactor conventional for radical polymerizations was charged with 18 g of acrylic acid, 380 g of n-butyl acrylate, 2 g of benzoin acrylate, 0.55 g of bis-2,2'-phenylethyl thiocarbonate and 170 g of acetone. Nitrogen gas was passed through the mixture with stirring for 45 minutes, after which the reactor was heated to 58° C. and 0.3 g of azoisobutyronitrile (AIBN, Vazo 64™, DuPont) was added. Then the external heating bath was heated to 75° C. and the reaction was carried out constantly at this external temperature. After a reaction time of 1 hour a further 0.3 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 5

Narrow $M_w$ Distribution; UV Photoinitiator

A 2 L glass reactor conventional for radical polymerizations was charged with 38 g of acrylic acid, 360 g of 2-ethylhexyl acrylate, 2 g of benzoin acrylate, 0.55 g of bis-2,2'-phenylethyl thiocarbonate and 133 g of acetone. Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Example 6

Narrow $M_w$ Distribution; UV Photoinitiator

A 2 L glass reactor conventional for radical polymerizations was charged with 16 g of acrylic acid, 191 g of 2-ethylhexyl acrylate, 191 g of n-butyl acrylate, 2 g of benzoin acrylate, 0.55 g of bis-2,2'-phenylethyl thiocarbonate and 133 g of acetone. Nitrogen gas was passed through the mixture with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 4 hours and 8 hours, in each case 100 g of acetone were added for dilution. The reaction was terminated after 48 hours and the product cooled to room temperature. The average molecular weight and the polydispersity were determined by means of test C.

The polymer was concentrated in a vacuum drying oven at 80° C. under a pressure of 10 torr. Then method E was carried out, followed by UV crosslinking. Testing of the specimens was completed in accordance with test methods A, B and D.

Results

Examples R1, R4, R5, R6, and R7 were prepared as reference specimens. All these reference specimens were polymerized conventionally in an acetone/isopropanol mixture, the average molecular weight $M_w$ being adjusted by the proportion of isopropanol. The reference R1 contains no UV photoinitiator. Examples R4 and R5 illustrate the effect of the broad molecular weight distribution in combination with copolymerized UV photoinitiators, such as an acrylated benzophenone or benzoin acrylate, for example. In references R6 and R7 the molecular weight was lowered further and again the combination of copolymerized photoinitiator with broad molecular weight distribution was investigated. This made it possible to rule out a molecular weight effect.

Additionally, references R2 and R3 were prepared. Both polymers were prepared by controlled radical polymerization using a trithiocarbonate regulator. Reference R2 contains no UV photoinitiator and shows that the regulator used does not function as a UV photoinitiator. Reference 3 was prepared by the same method except that in this case a free UV photoinitiator was admixed. Benzophenone possesses the same parent structure as Ebecryl P36™ (UCB) but after the mixing process is not firmly attached to the polymer chain. This reference was used to investigate the efficiency possessed by the copolymerized photoinitiator in combination with the copolymerized trithiocarbonate.

For the process of the invention, Examples 1 to 6 are attached. In Examples 1 and 2, narrow-distribution acrylic PSAs were prepared using a trithiocarbonate regulator and using two different copolymerized photoinitiators. In Examples 3 and 4 the procedure was similar except that, in accordance with references R6 and R7, the average molecular weight was lowered further and thus the molecular weight effect was investigated. In Examples 5 and 6 the comonomer composition was altered; by this means it was possible to demonstrate that the process of the invention can be used for different acrylic PSAs.

Table 1 below first summarizes the results of the polymerizations:

TABLE 1

| Example | $M_W$ [g/mol] | Polydispersity, PD |
| --- | --- | --- |
| R1 | 381 000 | 4.7 |
| R2 | 365 000 | 2.1 |
| R3 | 365 000 | 2.1 |
| R4 | 402 000 | 5.1 |
| R5 | 386 000 | 4.5 |
| R6 | 256 000 | 4.2 |
| R7 | 217 000 | 5.8 |
| 1 | 378 000 | 2.2 |
| 2 | 389 000 | 2.0 |
| 3 | 241 000 | 1.9 |
| 4 | 238 000 | 1.5 |
| 5 | 374 000 | 1.8 |
| 6 | 376 000 | 1.9 |

$M_W$: average molecular weight from GPC
PD: $M_W/M_n$ = polydispersity from GPC Table 1 shows that the radical polymerizations conducted in a controlled manner give a significantly narrower molecular weight distribution (PD). The polymerizations were carried out such that the molecular weight ranges obtained are comparable with one another. This applies in particular to the comparison of broad versus narrow molecular weight distribution.

In Table 2 below the examples were processed to give PSA tape specimens, crosslinked with UV radiation and then tested for their adhesive properties. The gel index in particular is a decisive criterion for the crosslinking efficiency.

TABLE 2

| Example | UV radiation; number of passes | SST 10° C., 10 N [min] | BS-steel [N/cm] | Gel index [%] |
| --- | --- | --- | --- | --- |
| R1 | 1 | 1 | 4.4 | 0 |
| R1 | 2 | 2 | 4.7 | 0 |
| R2 | 1 | 1 | 4.5 | 0 |
| R2 | 2 | 2 | 4.7 | 0 |
| R3 | 1 | 5 | 7.1 | 3 |
| R3 | 2 | 11 | 5.5 | 17 |
| R4 | 1 | 171 | 4.3 | 29 |
| R4 | 2 | 102 | 3.7 | 43 |
| R5 | 1 | 6 | 5.4 | 13 |
| R5 | 2 | 73 | 4.1 | 42 |
| R6 | 1 | 163 | 5.4 | 23 |
| R6 | 2 | 123 | 3.9 | 40 |
| R7 | 1 | 1 | 8.0 | 3 |
| R7 | 2 | 19 | 5.4 | 23 |
| 1 | 1 | 78 | 5.4 | 37 |
| 1 | 2 | 139 | 3.9 | 63 |
| 2 | 1 | 104 | 4.5 | 53 |
| 2 | 2 | 93 | 3.2 | 69 |
| 3 | 1 | 98 | 4.5 | 35 |
| 3 | 2 | 130 | 3.2 | 60 |
| 4 | 1 | 221 | 4.8 | 42 |

TABLE 2-continued

| Example | UV radiation; number of passes | SST 10° C., 10 N [min] | BS-steel [N/cm] | Gel index [%] |
| --- | --- | --- | --- | --- |
| 4 | 2 | 216 | 3.6 | 64 |
| 5 | 1 | 2256 | 4.5 | 45 |
| 5 | 2 | 1674 | 4.1 | 68 |
| 6 | 1 | 365 | 4.8 | 41 |
| 6 | 2 | 322 | 4.2 | 65 |

SST: Shear stability time
RT: Room temperature
BS: Bond strength
Application rate 50 g/m$^2$ Table 2 reveals that the reference specimen R1 with a broad molecular weight distribution and no photoinitiator undergoes no measureable crosslinking. With either one or two radiation passes, no gel index is measured. The technical adhesive properties indicate that the corresponding PSA tape possesses no cohesion and sticks cohesively during the measurement of bond strength.

If the polymerization is conducted in the presence of a trithiocarbonate and a comparable molecular weight is attained, this changes nothing as far as the crosslinking behavior is concerned. It is still not possible to measure any gel index following UV radiation, and the specimens split cohesively during adhesive testing. Copolymerized trithiocarbonates can therefore not be used as UV photoinitiators for acrylic PSAs. If a free UV photoinitiator is added to this polymer (Reference Example 3), the crosslinking behavior is improved, although the gel indices achieved are below those of conventional acrylic PSAs with copolymerized UV photoinitiators. Thus after 2 UV passes a gel index of 17% is measured, this value still being much too low for PSAs. The optimum range is situated at a gel index of 50%. The technical adhesive properties demonstrate this. The shear strength in particular is still much too low.

Reference Examples R4 and R5 are references for conventional UV-crosslinkable acrylic PSAs with a copolymerized UV photoinitiator and a broad molecular weight distribution. The different copolymerized photoinitiators allow these PSAs to undergo significantly better crosslinking already. Comparison with the analogous specimens with a narrow molecular weight distribution (Examples 1 and 2), however, illustrates the fact that the crosslinking efficiency of the Reference Examples is still significantly lower. Thus for Reference Example R4 following one UV pass a gel index of 29% and after two passes a gel index of 43% is measured. The polymer of Example 1, which is of the invention by contrast, has a gel index of 37% after one irradiation pass and an index of 63% after two passes. Comparing Reference Example R5 with Example 2, the corresponding figures are 13% as against 53% after one UV pass and 42% as against 69% after two passes.

As far as the crosslinking efficiency is concerned, therefore, there is a synergistic effect of narrow molecular weight distribution, copolymerized UV photoinitiator, and trithiocarbonate function within the polyacrylate. This effect could not have been expected. Comparing, then the technical adhesive properties, to start with only the pairings R4 and Example 1, and R5 and Example 2, with approximately the same gel index, can be compared with one another, since both the shear strength and the bond strength are dependent on the degree of crosslinking. In general, the bond strength falls as the gel index (degree of crosslinking) goes up, for the regular case where the PSA tape undergoes adhesive detachment from the substrate. In the case of shear strength, the pattern is inverted completely. As the gel index goes up, there is first of all an increase in the shear strength as well until ultimately the polymer is overcrosslinked and the sample detaches from the substrate adhesively in the shear test.

Comparing, then, the bond strengths of Reference Example R4 with Example 1, it is evident that R4 with a gel index of 43% has a bond strength which, at 3.7 N/cm, is relatively low. The bond strengths of Example 4 are much higher, at 5.4 N/cm for a gel index of 37% and 3.9 N/cm at 63%. This might be an effect of the narrow molecular weight distribution. As far as the shear strength is concerned it is not possible to draw any conclusions, since here the differences are very low and in comparison the shear strength increases as the gel index goes up. Comparing Example R5 with R2, it is possible to carry out a comparison of gel index 42% (R5) with 53% (2). With regard to the bond strength, the same trend is again evident: the more narrowly distributed PSA possesses a bond strength of 4.5 N/cm for a gel index of 53%; the broadly distributed PSA possesses a bond strength of 4.1 N/cm with a lower gel index. Thus in this comparison as well it is evident that the narrow-distribution PSA possesses a higher bond strength despite the fact that the gel index is higher and the composition ought therefore to flow out to less of an extent on the substrate.

For further verification a reduction in molecular weight was undertaken. Examples R6 and R7 were prepared as references. As a result of the reduction in molecular weight, the UV crosslinking efficiency of these was even less than the higher molecular weight reference specimens R4 and R5. In accordance with the invention, Examples 3 and 4 were then synthesized and compared with the references. A comparison of the gel indexes demonstrates again that Examples 3 and 4 have a significantly higher gel index at all UV doses as compared with references R6 and R7. A comparison of the bond strengths also shows again that, in a comparison of R6 with 3, the narrow-distribution PSA again possesses a higher bond strength, although the gel index is lower by 5%. Considering, in contrast, the shear strength of Example 4, the highest shear strengths are measured here for this comonomer composition. This might again be an indication of the fact that a narrow molecular weight distribution is preferable for compositions with greater shear strength.

With Examples 5 and 6, two further polyacrylates of the invention with different comonomer compositions were prepared. The more polar composition is evidence that UV-crosslinkable PSAs with high cohesion are also attainable.

We claim:

1. A polyacrylate pressure sensitive adhesive having
    an average molecular weight $M_w$ (weight average) of from 100 000 to 600 000 g/mol
    a polydispersity of not more than 3.0
    copolymerized photoinitiator units.

2. The adhesive as claimed in claim 1, blended with one or more resins.

3. The adhesive as claimed in claim 1, blended with additives.

4. A process for preparing a UV-crosslinkable polyacrylate pressure sensitive adhesive having a polydispersity of not more 3.0, comprising
    a radical polymerization process for preparing a polymer from a monomer mixture,
    the monomer mixture to be polymerized comprising copolymerizable photoinitiators,
    the polymerization process being regulated by the presence of at least one chemical compound comprising the unit —S—C=X, in which X is S, O or N.

5. The process as claimed in claim 4, wherein said at least one chemical compound comprising the unit —S—C=X is selected from the group consisting of trithiocarbonates and dithioesters.

6. The process as claimed in claim 5, wherein following polymerization the polymer is concentrated to a hotmelt with a residual solvent fraction of <2%, and is coated from the melt, gel-free, onto a backing.

7. The process as claimed in claim 6, wherein, following coating onto the backing, the polymer is crosslinked by UV radiation.

8. The process as claimed in claim 4, wherein before the polymerization, during the polymerization, or both, thermally decomposing, radical-forming initiators are added.

9. A process for preparing acrylic pressure sensitive adhesives, which comprises polymerizing a monomer mixture comprising at least the following components:
    (a) 68–99.9% by weight of acrylates, methacrylates, their free acids, or a mixture thereof, of the following formula $CH_2=CH(R_1)(COOR_2)$, where $R_1$ is H or $CH_3$ and $R_2$ is an alkyl chain having from 1 to 30 carbon atoms or H,
    (b) 0.05–2% by weight of copolymerizable UV photoinitiators containing a radically polymerizable double bond.

10. The process as claimed in claim 9, wherein the monomer mixture further comprises component
    (c) up to 30% by weight of olefinically unsaturated monomers containing functional groups.

11. A single-sided or double-sided pressure-sensitive adhesive tape comprising the polyacrylate pressure sensitive adhesive of claim 1, 2, or 3 or the polyacrylate pressure sensitive adhesive prepared by a process of claim 4, 5, 6, 7, 8, 9 or 10.

12. The adhesive as claimed in claim 2, wherein said resins are present in an amount of up to 50% by weight of the blend.

13. The adhesive as claimed in claim 12, wherein said amount is from 20 to 40% by weight.

14. The adhesive as claimed in claim 3, wherein said additives are selected from the group consisting of aging inhibitors, light stabilizers, ozone protectants, fatty acids, plasticizers, nucleators, blowing agents, accelerators, fillers and combinations thereof.

15. The process of claim 6, wherein said residual fraction is <1% by weight.

16. The process of claim 15, wherein said residual fraction is <0.5% by weight.

17. The process of claim 8, wherein said radical-forming initiators are selected from the group consisting of axo initiators, peroxo initiators and combinations thereof.

18. The process of claim 17, wherein the addition of said initiators is made in at least two process stages.

19. The process of claim 9, wherein the amount of component (a) is 75–99.5% by weight.

20. The process of claim 9, wherein the amount of component (b) is 0.4–1% by weight.

* * * * *